United States Patent
Hirabe

(10) Patent No.: US 8,532,685 B2
(45) Date of Patent: Sep. 10, 2013

(54) MOBILE COMMUNICATION SYSTEM, BASE STATION AND INTERFERENCE REMOVAL METHOD

(75) Inventor: Masashi Hirabe, Tokyo (JP)

(73) Assignee: NEC Corporation, Tokyo (JP)

( * ) Notice: Subject to any disclaimer, the term of this patent is extended or adjusted under 35 U.S.C. 154(b) by 180 days.

(21) Appl. No.: 12/997,319

(22) PCT Filed: Jun. 19, 2009

(86) PCT No.: PCT/JP2009/061185
§ 371 (c)(1),
(2), (4) Date: Dec. 10, 2010

(87) PCT Pub. No.: WO2010/007855
PCT Pub. Date: Jan. 21, 2010

(65) Prior Publication Data
US 2011/0098067 A1    Apr. 28, 2011

(30) Foreign Application Priority Data
Jul. 14, 2008    (JP) ................................. 2008-182454

(51) Int. Cl.
*H04B 15/00* (2006.01)
*H04B 1/00* (2006.01)
*H03D 1/04* (2006.01)

(52) U.S. Cl.
USPC ........................... 455/501; 375/144; 375/346

(58) Field of Classification Search
USPC ............... 455/562.1, 63.4, 65; 375/144, 346, 375/320, 335, 342
See application file for complete search history.

(56) References Cited

U.S. PATENT DOCUMENTS

| 5,966,095 A * | 10/1999 | Hiramatsu et al. ............ 342/383 |
| 6,069,912 A * | 5/2000 | Sawahashi et al. ........... 375/142 |
| 6,577,686 B1 * | 6/2003 | Koga et al. .................... 375/347 |
| 7,010,023 B1 * | 3/2006 | Sato ............................. 375/150 |
| 7,265,714 B2 * | 9/2007 | Goldberg ...................... 342/378 |
| 2007/0117513 A1 * | 5/2007 | Kasami et al. ............... 455/63.4 |

FOREIGN PATENT DOCUMENTS

| CN | 1860700 A | 11/2006 |
| JP | 63-35131 A | 7/1988 |
| JP | 6-204902 A | 7/1994 |
| JP | 2003244046 A | 8/2003 |
| TW | 510132 | 11/2002 |
| TW | 200640202 | 11/2006 |

OTHER PUBLICATIONS

International Search Report for PCT/JP2009/061185 mailed Sep. 1, 2009.
Taiwanese Office Action for TW098122207 dated Oct. 26, 2012.
Chinese Office Action for CN 200980126003.7 issued on Apr. 2, 2013 with English Translation.

* cited by examiner

*Primary Examiner* — Andrew Wendell
*Assistant Examiner* — Maryam Soltanzadeh

(57) ABSTRACT

A base station of the present invention includes: first and second antenna elements that have polarization characteristics orthogonal to each other; a first converter that converts a received signal of the first antenna element into a baseband signal; a first multiplier that weights the baseband signal converted by the first converter by multiplying a first weight coefficient; a second converter that converts a received signal of the second antenna element into a baseband signal; a second multiplier that weights the baseband signal converted by the second converter by multiplying a second weight coefficient; an adder that adds the baseband signals weighted by the first and second multipliers and outputs the sum; and, a signal processor that calculates the first and second coefficients by MMSE such that the combined polarization of the received signals of the first and second antenna elements will be orthogonal to the polarization of an interference signal.

10 Claims, 3 Drawing Sheets

MOBILE COMMUNICATION SYSTEM, BASE STATION AND INTERFERENCE REMOVAL METHOD

This application is the National Phase of PCT/JP2009/061185, filed Jun. 19, 2009, which claims priority, based on JP 2008-182454 filed on Jul. 14, 2008, and should incorporate all the disclosure thereof herein.

TECHNICAL FIELD

The invention relates to a mobile communication system, a base station and an interference removal method.

BACKGROUND ART

In a mobile communication system, a plurality of mobile terminals can make radio communication with a base station, using the identical frequency.

When the base station performs radio communication with a certain mobile terminal, the quality of reception is deteriorated if the received signal (the desired signal) that is received from the mobile terminal is interfered with by a received signal (the interference signal) that is received from another mobile terminal.

As one example of an interference removal technology for removing such interference signals, there is a technology in which an antenna is formed of a plurality of antenna elements so that the received signals at individual antenna elements are antenna-combined to control the antenna directivity (see Patent Document 1). According to this, the antenna directivity is controlled so that a null is formed in the direction of an interference signal, whereby the interference signal can be removed.

Prior Art Documents

Patent Document
Patent Document 1: JP06-204902A

SUMMARY OF THE INVENTION

Problems to be Solved by the Invention

However, the interference removal technology described above has the problem that if an interference signal exists in the same direction as the desired signal, the interference signal cannot be removed because no null can be created in the direction of the interference signal.

Further, in the above-described interference removal technology, since the antenna is configured of multiple antenna elements, there is the problem that the size of the entire antenna becomes large.

The object of the present invention is to provide a mobile communication system, a base station and an interference removal method that solve one of the above-described problems.

Means for Solving the Problems

In order to attain the above object, the mobile communication system of the present invention is a mobile communication system including mobile terminals and a base station performing radio communication with the mobile terminals, wherein the base station includes: first and second antenna elements that have polarization characteristics orthogonal to each other; a first baseband signal converter that converts a received signal received by the first antenna element into a baseband signal; a first multiplier that weights the baseband signal converted by the first baseband signal converter by multiplying a first weight coefficient; a second baseband signal converter that converts a received signal received by the second antenna element into a baseband signal; a second multiplier that weights the baseband signal converted by the second baseband signal converter by multiplying a second weight coefficient; an adder that adds up the baseband signals weighted by the first and second multipliers and outputs the sum; and, a signal processor that calculates the first and second coefficients to be used by the first and second multipliers by MMSE (Minimum Mean Square Error), such that the first and second weight coefficients make the combined polarization of the received signals received at the first and second antenna elements orthogonal to the polarization of an interference signal.

In order to attain the above object, the base station of the present invention is a base station performing radio communication with mobile terminals, comprising: first and second antenna elements that have polarization characteristics orthogonal to each other; a first baseband signal converter that converts a received signal received by the first antenna element into a baseband signal; a first multiplier that weights the baseband signal converted by the first baseband signal converter by multiplying a first weight coefficient; a second baseband signal converter that converts a received signal received by the second antenna element into a baseband signal; a second multiplier that weights the baseband signal converted by the second baseband signal converter by multiplying a second weight coefficient; an adder that adds up the baseband signals weighted by the first and second multipliers and outputs the sum; and, a signal processor that calculates the first and second coefficients to be used by the first and second multipliers by MMSE, such that the first and second weight coefficients make the combined polarization of the received signals received at the first and second antenna elements orthogonal to the polarization of an interference signal.

In order to attain the above object, the interference removal method of the base station is an interference removal method of a base station that performs radio communication with mobile terminals, comprising: a first converting step of converting a received signal received by a first antenna element having a first polarization characteristic into a baseband signal; a first multiplying step of weighting the baseband signal converted at the first converting step by multiplying a first weight coefficient; a second converting step of converting a received signal received by a second antenna element having a second polarization characteristic that is orthogonal to the first polarization characteristic into a baseband signal; a second multiplying step of weighting the baseband signal converted at the second converting step by multiplying a second weight coefficient; an adding step of adding up the baseband signals weighted by the first and second multipliers and outputting the sum; and, a calculating step of calculating the first and second coefficients to be used by the first and second multipliers by MMSE, such that the first and second weight coefficients make the combined polarization of the received signals received at the first and second antenna elements orthogonal to the polarization of the interference signal.

Effect of the Invention

According to the present invention, since the base station is configured so that the combined polarization of the received signals at the first and second antenna elements is made orthogonal to the polarization of the interference signal by MMSE so as not to be able to receive interference signals that are orthogonal to the combined polarization, it is possible to remove an interference signal even if the interference signal exists in the same direction as the desired signal.

Further, since the base station is constructed with the antenna of first and second antenna elements having polarization characteristics that are orthogonal to each other, if plural antenna elements are provided for each mobile terminal, it is possible to provide a configuration in which individual antenna elements are arranged in a row, whereby it is possible to achieve an effect in avoiding the size of the entire antenna becoming larger.

MODE FOR CARRYING OUT THE INVENTION

Now, the best mode for carrying out the present invention will be described with reference to the drawings.

Figure 1:
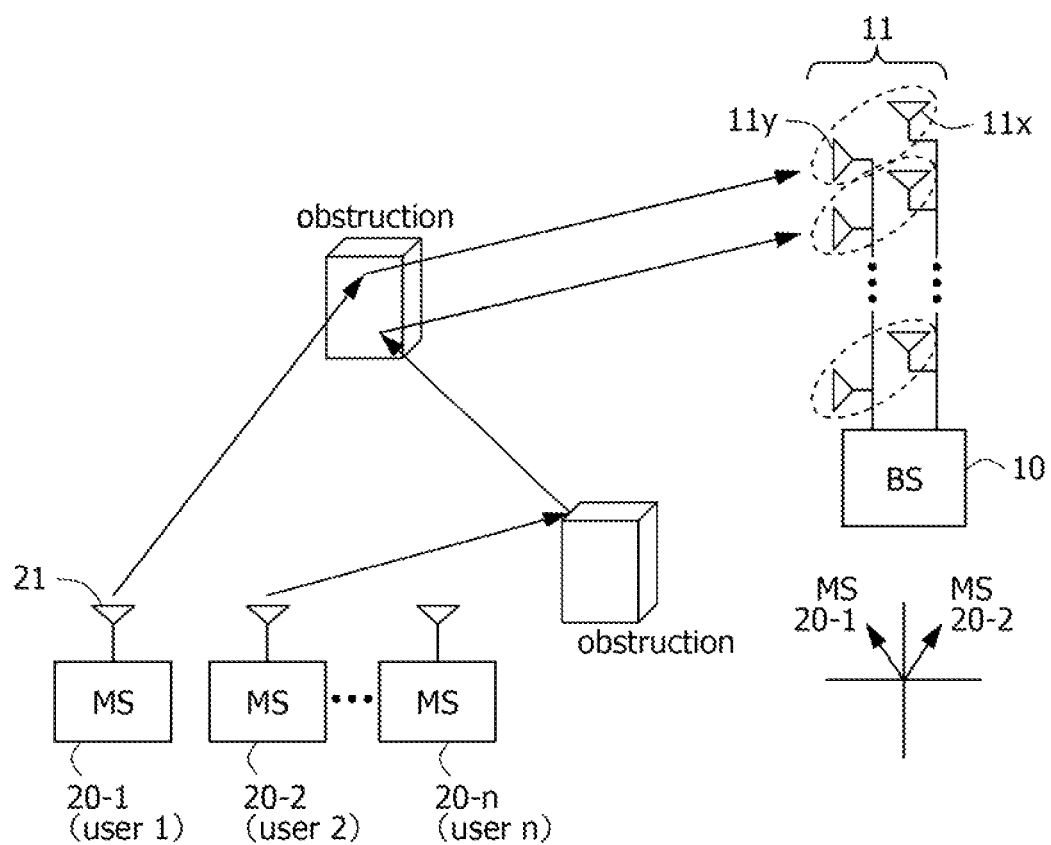
FIG. 1 is a diagram showing a configuration of a mobile communication system of one exemplary embodiment of the present invention.

FIG. 1 is a diagram showing an overall configuration of a mobile communication system of one exemplary embodiment of the present invention.

As shown in FIG. 1, the mobile communication system of the present exemplary embodiment includes base station (BS: Base Station) 10, n (n is a natural number equal to or greater than 2) mobile terminals (MS: Mobile Station) 20-1~20-n.

Antenna 11 of base station 10 is formed of n pairs of antenna elements 11x and 11y having polarization characteristics orthogonal to each other, one pair for each of mobile terminals 20-1~20-n.

Each antenna 21 of mobile terminals 20-1~20-n is formed of one antenna element having a vertical polarization characteristic.

Mobile communication is basically achieved by over-the-horizon communication in which no direct wave is propagated but the waves are reflected by obstructions such as buildings, etc. in the course of the propagation path, so that polarized waves that have been rotated are propagated.

Accordingly, polarized waves transmitted from mobile terminals 20-1 and 20-2 are both vertical polarized waves at the time of transmission, but are transformed into dissimilar polarizations when received by base station 10.

Figure 2:
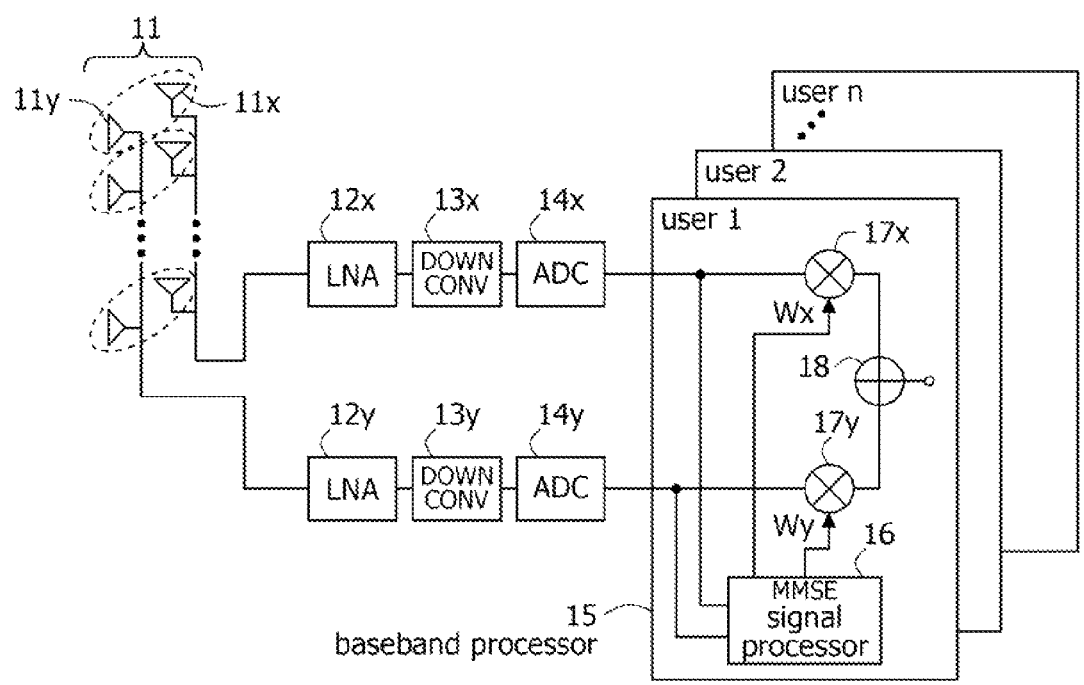
FIG. 2 is a block diagram showing a configuration of the base station shown in FIG. 1.

FIG. 2 is a block diagram showing a configuration of base station 10.

As shown in FIG. 2, base station 10 includes antenna 11 of n pairs of antenna elements 11x and 11y provided for each of mobile terminals 20-1~20-n, low-noise amplifiers (LNA: Low Noise Amplifier) 12x and 12y, down converters (Down Converter) 13x and 13y, A/D converters (ADC: Analog Digital Converter) 14x and 14y and n baseband processors 15 provided for each of mobile terminals 20-1~20-n. Here, antenna elements 11x and 11y and baseband processor 15 will operate without regard to the polarized wave at antenna 21 of the associated mobile terminal 20.

Further, baseband processor 15 includes MMSE (Minimum Mean Square Error) signal processor 16, multipliers 17x and 17y and adder 18.

Low-noise amplifier 12x, down converter 13x and A/D converter 14x form a baseband signal transformer for transforming a received signal received by antenna element 11x into a baseband signal.

Specifically, low-noise amplifier 12x amplifies the received signal received at antenna element 11x, down converter 13x down-converts the received signal output from low-noise amplifier 12x to the baseband, and A/C converter 14x A/D converts the signal output from down-converter 13x to generate and output a baseband signal.

Low-noise amplifier 12y, down converter 13y and A/D converter 14y form a baseband signal transformer for transforming a received signal received by antenna element 11y into a baseband signal.

Specifically, low-noise amplifier 12y amplifies the received signal received at antenna element 11y, down converter 13y down-converts the received signal output from low-noise amplifier 12y to the baseband, and A/C converter 14y A/D converts the signal output from down-converter 13y to generate and output a baseband signal.

Multiplier 17x weights the baseband signal output from A/D converter 14x by multiplying weighting coefficient Wx that is calculated at MMSE signal processor 16.

Multiplier 17y weights the baseband signal output from A/D converter 14y by multiplying weighting coefficient Wy that is calculated at MMSE signal processor 16.

Adder 18 adds up the weighted baseband signals that are output from multipliers 17x and 17y and outputs the sum.

MMSE signal processor 16 perform a signal processing based on MMSE with reference to the output signals from A/D converters 14x and 14y when antennas 11x and 11y receive pilot signals, and thereby calculates weight coefficients Wx and Wy and outputs the calculated weight coefficients Wx and Wy to multipliers 17x and 17y, respectively.

Specifically, MMSE signal processor 16, performs signal processing based on MMSE to calculate such weight coefficients Wx and Wy such that the combined polarization of the received signals received by antennas 11x and 11y will become perpendicular to the polarization of the interference signal and such that the signal level of the signal output from adder 18 will become maximum.

Here, the signal processing performed based on MMSE at MMSE signal processor 16 can use a known technique. Since the method is not limited, description is omitted.

Now, an interference removal method by base station 10 will be described with reference to FIG. 3.

Figure 3:
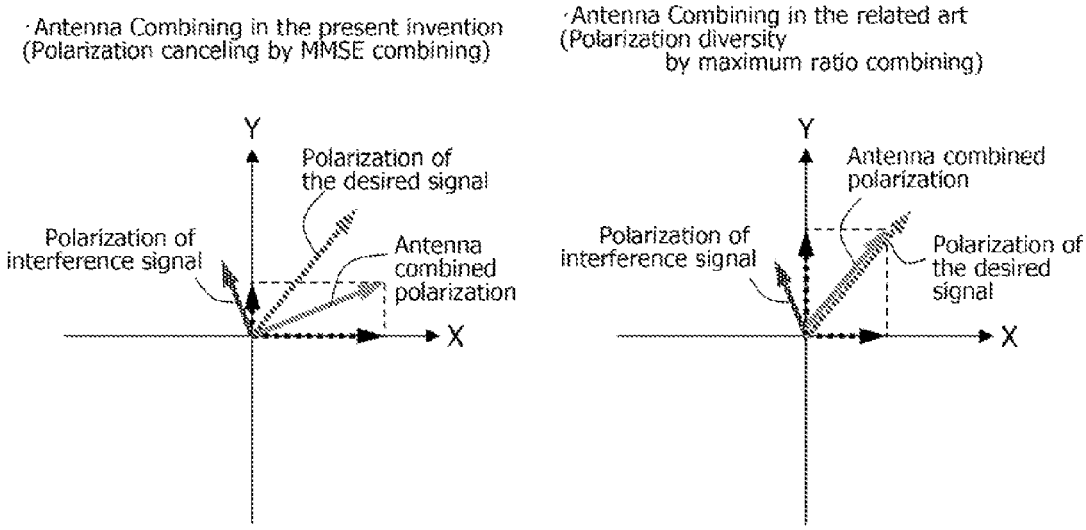
FIG. 3 is a diagram for explaining an antenna combining operation by the base station shown in FIG. 1.

FIG. 3 is a vector diagram for explaining an antenna combining operation for removing interference at base station 10. In FIG. 3, the left-hand side shows the antenna combining operation by base station 10 of the present invention, whereas the right-hand side shows the antenna combining operation of the related art for comparison.

As shown in FIG. 3, in the related art, maximum ratio combining (MRC: Maximum Ratio Combining) that combines the received signals at individual antenna elements in phase so as to maximize the signal level of the desired signal in conformity with the desired signal, is performed.

That is, in the related art, a process for maximizing the SNR (Signal to Noise ratio) is performed to thereby remove interference signals.

However, if an interference signal exists in the same direction as the desired signal, the interference signal is also received so that the reception quality is degraded.

In contrast to this, in the present invention, base station 10 performs antenna combination of the received signals at antenna elements 11x and 11y so that the combined polarization of the received signals at antenna elements 11x and 11y will become orthogonal to the polarization of the interference signal.

Accordingly, it is impossible to receive an interference signal that is orthogonal to the combined polarization of the received signals at antennas 11x and 11y, hence it is possible to remove the interference signal even if the interference signal exists in the same direction as the desired signal.

However, in this case, since there is a concern about the degradation of reception quality, base station 10 performs antenna combining so that the combined polarization of the received signals at antennas 11x and 11y will be orthogonal to the polarization of the interference signal and so that the SINR(Signal to Interference and Noise power Ratio) of the signal output from adder 18 will be maximized.

That is, in the present invention, a process for maximizing the SINR is performed, whereby reception quality is improved while removing interference signals.

As described heretofore, in the present exemplary embodiment, base station 10 is configured so that the combined polarization of the received signals at antenna elements 11x and 11y is made orthogonal to the polarization of the interference signal so that any interference signal that is orthogonal to the combined polarization cannot be received, hence it is possible to remove an interference signal even if the interference signal exists in the same direction as the desired signal.

Further, since base station 10 is constructed with antenna 11 including antenna elements 11x and 11y having polarization characteristics orthogonal to each other, if plural pairs of antenna elements 11x and 11y are provided, one for each of mobile terminals, it is possible to array antenna elements 11x and 11y in a row, hence it is possible to avoid the size of entire antenna 11 becoming larger.

Also, when base station 10 is not only configured so as to make the combined polarization of the received signals at antenna elements 11x and 11y orthogonal to the polarization of the interference signal but is also configured so as to maximize the SINR of the signal output from adder 18, it is possible to improve reception quality while removing the interference signal.

As the present invention has been described heretofore by referring to the exemplary embodiment, the present invention should not be limited to this exemplary embodiment. Various changes that will be understood by those skilled in the art can be added to the configurations and details of the present invention within the scope of the present invention.

The invention claimed is:

1. A mobile communication system including mobile terminals and a base station performing radio communication with the mobile terminals, wherein the base station includes:
first and second antenna elements that have polarization characteristics orthogonal to each other;
a first baseband signal converter that converts a received signal received by the first antenna element into a baseband signal;
a first multiplier that weights the baseband signal converted by the first baseband signal converter by multiplying a first weight coefficient;
a second baseband signal converter that converts a received signal received by the second antenna element into a baseband signal;
a second multiplier that weights the baseband signal converted by the second baseband signal converter by multiplying a second weight coefficient;
an adder that adds up the baseband signals weighted by the first and second multipliers and outputs the sum; and,
a signal processor that calculates the first and second coefficients to be used by the first and second multipliers by MMSE (Minimum Mean Square Error), such that the first and second weight coefficients make the combined polarization of the received signals received at the first and second antenna elements orthogonal to the polarization of an interference signal wherein the interference signal can be removed even if the interference signal exists in the same direction as a desired signal.

2. The mobile communication system according to claim 1, wherein the signal processor calculates the first and second weight coefficients by MMSE so that the combined polarization of the received signals received at the first and second antenna elements will be orthogonal to the polarization of an interference signal and that the SINR (Signal to Interference and Noise power Ratio) of the signal output from the adder will become maximum.

3. The mobile communication system according to claim 1, wherein the first antenna, the second antenna, the first multiplier, the second multiplier, the adder and the signal processor are provided for each of the mobile terminals.

4. The mobile communication system according to claim 3, wherein the first antenna, the second antenna, the first multiplier, the second multiplier, the adder and the signal processor operate independently of the polarization of the antennas at the mobile terminal.

5. A base station performing radio communication with mobile terminals, comprising:
first and second antenna elements that have polarization characteristics orthogonal to each other;
a first baseband signal converter that converts a received signal received by the first antenna element into a baseband signal;
a first multiplier that weights the baseband signal converted by the first baseband signal converter by multiplying a first weight coefficient;
a second baseband signal converter that converts a received signal received by the second antenna element into a baseband signal;
a second multiplier that weights the baseband signal converted by the second baseband signal converter by multiplying a second weight coefficient;
an adder that adds up the baseband signals weighted by the first and second multipliers and outputs the sum;
a signal processor that calculates the first and second coefficients to be used by the first and second multipliers by MMSE (Minimum Mean Square Error), such that the first and second weight coefficients make the combined polarization of the received signals received at the first and second antenna elements orthogonal to the polarization of an interference signal wherein the interference signal can be removed even if the interference signal exists in the same direction as a desired signal.

6. The base station according to claim 5, wherein the signal processor 10 calculates the first and second weight coefficients by MMSE so that the combined polarization of the received signals received at the first and second antenna elements will be orthogonal to the polarization of an interference signal and that the SINR of the signal output from the adder will become maximum.

7. The base station according to claim 5, wherein the first antenna, the second antenna, the first multiplier, the second multiplier, the adder and the signal processor are provided for each of the mobile terminals.

8. The base station according to claim 7, wherein the first antenna, the second antenna, the first multiplier, the second multiplier, the adder and the signal processor operate independently of the polarization of the antennas at the mobile terminal.

9. An interference removal method of a base station that performs radio communication with mobile terminals, comprising:

a first converting step of converting a received signal received by a first antenna element having a first polarization characteristic into a baseband signal;

a first multiplying step of weighting the baseband signal converted at the first converting step by multiplying a first weight coefficient;

a second converting step of converting a received signal received by a second antenna element having a second polarization characteristic that is orthogonal to the first polarization characteristic into a baseband signal;

a second multiplying step of weighting the baseband signal converted at the second converting step by multiplying a second weight coefficient;

an adding step of adding up the baseband signals weighted by the first and second multipliers and outputting the sum;

a signal processor that a calculating step of calculating the first and second coefficients to be used by the first and second multipliers by MMSE, such that the first and sec and weight coefficients make the combined polarization of the received signals received at the first and second antenna elements orthogonal to the polarization of an interference signal wherein the interference signal can be removed even if the interference signal exists in the same direction as a desired signal.

10. The interference removal method according to claim 9, wherein at the calculating step the first and second weight coefficients are calculated by MMSE so that the combined polarization of the received signals received at the first and second antenna elements will be orthogonal to the polarization of an interference signal and that the SINR of the signal output from the adder will become maximum.

* * * * *